United States Patent
Inoue et al.

(10) Patent No.: US 7,152,395 B2
(45) Date of Patent: *Dec. 26, 2006

(54) METHOD AND APPARATUS FOR CONTROLLING INTERNAL COMBUSTION ENGINE

(75) Inventors: Toshio Inoue, Gotenba (JP); Yasuhiro Oi, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 137 days.

This patent is subject to a terminal disclaimer.

(21) Appl. No.: 10/829,192

(22) Filed: Apr. 22, 2004

(65) Prior Publication Data

US 2004/0194452 A1    Oct. 7, 2004

Related U.S. Application Data

(63) Continuation of application No. 10/133,410, filed on Apr. 29, 2002, now Pat. No. 6,742,327.

(30) Foreign Application Priority Data

May 29, 2001    (JP)    ............................. 2001-160201

(51) Int. Cl.
*F01N 3/00*    (2006.01)

(52) U.S. Cl. ........................... 60/286; 60/274; 60/280; 60/284; 180/65.2; 180/65.3; 180/65.4

(58) Field of Classification Search .................. 60/274, 60/280, 284, 285, 286; 180/65.2, 65.3, 65.4
See application file for complete search history.

(56) References Cited

U.S. PATENT DOCUMENTS

| | | | |
|---|---|---|---|
| 5,941,211 A | 8/1999 | Brehob et al. | ............... 123/325 |
| 6,173,569 B1 | 1/2001 | Kusada et al. | |
| 6,220,019 B1 | 4/2001 | Sugiura et al. | |
| 6,276,472 B1 * | 8/2001 | Takashima et al. | ......... 180/65.2 |
| 6,293,095 B1 * | 9/2001 | Yamamoto et al. | ............ 60/286 |
| 6,321,530 B1 | 11/2001 | Hoshi et al. | |
| 6,581,373 B1 | 6/2003 | Suzuki et al. | |
| 6,595,307 B1 | 7/2003 | Suzuki | |
| 6,742,327 B1 * | 6/2004 | Inoue et al. | ................... 60/285 |
| 6,785,603 B1 * | 8/2004 | Inoue | ......................... 701/112 |
| 6,834,632 B1 * | 12/2004 | Kataoka et al. | ........... 123/179.4 |
| 6,901,747 B1 * | 6/2005 | Tashiro et al. | ................. 60/286 |

FOREIGN PATENT DOCUMENTS

| | | |
|---|---|---|
| DE | 198 58 468 A1 | 8/1999 |
| DE | 199 63 277 A1 | 7/2000 |
| DE | 100 38 655 A1 | 2/2001 |

(Continued)

OTHER PUBLICATIONS

Japanese Office Action (w/ English-language translation), Sep. 1999, Japan.

*Primary Examiner*—Binh Q. Tran
(74) *Attorney, Agent, or Firm*—Oliff & Berridge, PLC

(57) ABSTRACT

A method and apparatus controls an internal combustion engine of a vehicle in which an exhaust purifying catalyst capable of storing oxygen is provided in an exhaust system of the engine. The internal combustion engine is adapted to be temporarily stopped when a predetermined condition for stopping the engine is satisfied, and resumes its operation when the predetermined condition is eliminated. The internal combustion engine is operated so as to reduce an amount of oxygen stored in the exhaust purifying catalyst during a temporary stoppage of the engine, before fuel starts being burned for resuming the operation of the engine.

21 Claims, 4 Drawing Sheets

| | FOREIGN PATENT DOCUMENTS | | JP | A 2000-54826 | 2/2000 |
|---|---|---|---|---|---|
| | | | JP | A 2000-104588 | 4/2000 |
| JP | A-8-193537 | 7/1996 | JP | 11-351476 | 6/2001 |
| JP | 11257131 A | 9/1999 | | | |
| JP | A-2000-027677 | 1/2000 | * cited by examiner | | |

METHOD AND APPARATUS FOR CONTROLLING INTERNAL COMBUSTION ENGINE

This is a Continuation of application Ser. No. 10/133,410 filed Apr. 29, 2002 now U.S. Pat. No. 6,742,327. The entire disclosure of the prior application is hereby incorporated by reference in its entirety.

The disclosure of Japanese Patent Application No. 2001-160201 filed on May 29, 2001, including the specification, drawings and abstract, is incorporated herein by reference in its entirety.

BACKGROUND OF THE INVENTION

1. Field of Invention

The invention generally relates to methods and apparatus for controlling an internal combustion engine of a motor vehicle, and more particularly to methods and apparatus for controlling an internal combustion engine in which an exhaust purifying catalyst having a function of storing oxygen is disposed in an exhaust system. In particular, the invention is concerned with methods and apparatus for controlling such an internal combustion engine that is temporarily stopped when predetermined conditions for stopping the engine are satisfied, and resumes its operation when the engine stoppage conditions are eliminated, so as to reduce NOx emissions resulting from the temporary stoppage of the engine.

2. Description of Related Art

In general, an exhaust purifying catalyst, such as a three-way catalyst, is provided in an exhaust system of an internal combustion engine of a motor vehicle, such as an automobile. The three-way catalyst of this type induces reactions between NOx and CO or HC as harmful components contained in exhaust gases of the engine, thereby converting these components into harmless $N_2$, $CO_2$ or $H_2O$. The catalyst has a tendency of storing oxygen when an exhaust gas containing excessive oxygen, in view of a balance between an oxidizing component and a reducing component, or air passes through the catalyst. If the internal combustion engine is stopped for a long period of time, the exhaust purifying catalyst is naturally exposed to oxygen in the atmosphere, whereby the amount of oxygen stored in the catalyst reaches its saturation limit. As the amount of oxygen stored in the exhaust purifying catalyst increases, its capability of reducing or removing NOx may deteriorate. At the time of a start of the engine, therefore, the amount of fuel supplied to the engine is temporarily increased to be greater than a value corresponding to the stoichiometric air/fuel ratio, in accordance with the amount of oxygen stored in the catalyst, so that the catalyst is subjected to a reduction process utilizing the increased amount of fuel.

In view of increasing demands for saving of fuel resources and environmental protection (e.g., prevention of air pollution) in recent years, more and more attention has been drawn to so-called "eco-run" (economical-ecological running) vehicles and hybrid vehicles, in which an internal combustion engine is temporarily stopped when the vehicle is temporarily stopped at signals or in a traffic jam, or when the vehicle is preferably driven by an electric motor, rather than the engine. Since a temporary stoppage of the engine during an operation of the eco-run vehicle or hybrid vehicle only lasts for a short time period (e.g., not longer than about 10 min.), the exhaust purifying catalyst is kept from storing oxygen due to entry of air from the outlet of the exhaust system during such a short time period. However, the engine keeps moving/revolving for a while even after fuel supply to the engine is cut off or interrupted so as to stop the engine. During this idling of the engine, air containing no fuel component is introduced into the exhaust system, and oxygen in that air is stored in the exhaust purifying catalyst.

One example of a hybrid vehicle, which is currently manufactured and sold by the assignee of the present application, has a driving system as schematically illustrated in FIG. 1. With this driving system, the internal combustion engine may keep rotating even after fuel supply to the engine is interrupted so as to temporarily stop the operation of the engine. More specifically, the driving system of FIG. 1 includes an internal combustion engine 1, which is coupled to a generator 3 and an electric motor 4 via a drive coupling device 2 including a planetary gear set. A pair of drive wheels 6a, 6b are provided with respective axles 7a, 7b, which are connected to the axis of the motor 4 via a differential gear mechanism 8 and a transmission 5. The driving system of FIG. 1 is not provided with a clutch which was normally provided in a conventional vehicle driving system. With this arrangement, the speed of rotation and input torque (positive or negative) of the drive wheels 6a, 6b are controlled by combining the speeds of rotation and output torques of the engine and the electric motor and the speed of rotation and load (negative torque) of the generator by means of the planetary gear set of the drive coupling device 2. In some cases, such as when the vehicle is in a decelerating state or when the vehicle is being driven by the electric motor, no power needs to be generated by the engine, and fuel supply to the engine is cut off or interrupted. Even though the engine is allowed to stop rotating in these cases, the engine may still keep rotating while supplying no torque, depending upon the operating conditions of the vehicle. In this specification, "stoppage of the engine" is to be interpreted to include an idling state of the engine (i.e., a state in which the components of the engine (e.g., the pistons, etc.) are moving) with no fuel supplied thereto.

Referring again to FIG. 1, the driving system further includes a battery 9, or other storage device, an inverter 10, a catalytic converter 11, such as a three-way catalyst, provided in an exhaust system of the engine 1, and an electronic control unit 12. The electronic control unit 12 receives a signal indicative of an amount Dp of depression of an accelerator pedal, a signal indicative of a vehicle speed Sv, a signal indicative of a crank angle θe, a signal indicative of a temperature Te of the engine, and a signal indicative of a temperature Tc of the catalytic converter.

SUMMARY OF THE INVENTION

It is therefore an object of the invention to provide methods and apparatus for controlling an internal combustion engine capable of intermittent operations, which methods permit an effective reduction process to occur, in which the oxygen content is reduced in an exhaust purifying catalyst that stores oxygen in various ways each time the engine is temporarily stopped. This reduces NOx that would be otherwise emitted upon a restart of the engine because of the oxygen stored in the exhaust purifying catalyst.

To accomplish the above and/or other object(s), there is provided according to one aspect of the invention, methods and apparatus for controlling an internal combustion engine of a vehicle in which an exhaust purifying catalyst capable of storing oxygen is provided in an exhaust system of the engine, the internal combustion engine temporarily substantially stopping when a predetermined condition for stopping the engine is satisfied, and resuming an operation thereof when the predetermined condition is eliminated. According to this aspect of the invention, the internal combustion engine is operated so as to reduce an amount of oxygen stored in the exhaust purifying catalyst during a temporary stoppage of the engine, before fuel starts being burned for resuming the operation of the engine.

Even when the internal combustion engine is temporarily stopped and fuel supply to the engine is interrupted, the engine keeps rotating (i.e., idling) for a while, and oxygen is stored into the exhaust purifying catalyst during this idling of the engine. If fuel is temporarily supplied to the engine within a selected period during such idling of the engine, the exhaust purifying catalyst is subjected to a reduction process during this engine idling, resulting in reduction in NOx emissions at the time of a restart of the engine.

In one preferred embodiment of the invention, temporary fuel supply is carried out during an initial period of cranking for resuming the operation of the internal combustion engine.

When the engine speed becomes lower than a predetermined threshold value upon a temporary stoppage of the engine, the engine resumes its operation through cranking. To start the engine by cranking, an electric motor drives the engine so as to gradually increase its speed, and fuel injection is started when the engine speed reaches a predetermined value. Upon a start of the engine by cranking, therefore, the engine is held in an idling state for a certain period of time, i.e., from the beginning of cranking to a point of time when the engine speed reaches the predetermined value, before normal supply of fuel to be burned is started so as to resume an operation of the engine. If a fuel is temporarily supplied for a selected time period during idling of the engine within an initial period of cranking, the exhaust purifying catalyst, which is in a warmed-up state and stores oxygen, can be immediately subjected to a reduction process using the fuel containing a combustible component. This reduction process is performed before burning of fuel for restarting the engine is initiated, without causing any delay in restarting the engine through cranking. Thus, the temporary fuel supply makes it possible to reduce NOx emissions at the time of a restart of the engine.

In another preferred embodiment of the invention, the temporary fuel supply is carried out when the engine, which has been temporarily stopped, resumes its operation in response to a request for restarting the engine, prior to normal supply of fuel to the engine.

If the engine keeps running (i.e., idling) at a speed higher than the above-indicated threshold value even after the engine is temporarily stopped (i.e., shut off), cranking is not required in order to resume a normal operation of the engine which has been in an idling state, in response to a request for restarting the engine. In this case, a fuel for reducing the catalyst is temporarily supplied before normal supply of fuel to be burned is started in response to a request for a normal operation of the engine, so that the fuel flows into the exhaust purifying catalyst, along with exhaust flow during idling of the engine, so as to reduce the catalyst which is in a warmed-up state and stores oxygen. In this manner, the exhaust purifying catalyst can be immediately subjected to a reduction process, without causing any delay in restarting the engine in response to a request for the normal engine operation. Thus, the temporary fuel supply makes it possible to reduce NOx emissions at the time of restarting of the engine.

BRIEF DESCRIPTION OF THE DRAWINGS

The foregoing and/or further objects, features and advantages of the invention will become more apparent from the following description of preferred embodiments with reference to the accompanying drawings, in which like numerals are used to represent like elements and wherein.

DETAILED DESCRIPTION OF PREFERRED EMBODIMENTS

One exemplary comprehensive embodiment of the invention, which incorporates several control schemes, will be described in detail. FIGS. 2, 3 and 4 are parts of a flowchart that are linked to each other at A and B. The flowchart of FIGS. 2, 3 and 4 illustrates flow of control performed according to the comprehensive embodiment of the invention. The processes of the flowchart are performed, for example, by the electronic control unit 12 in FIG. 1.

Figure 1:
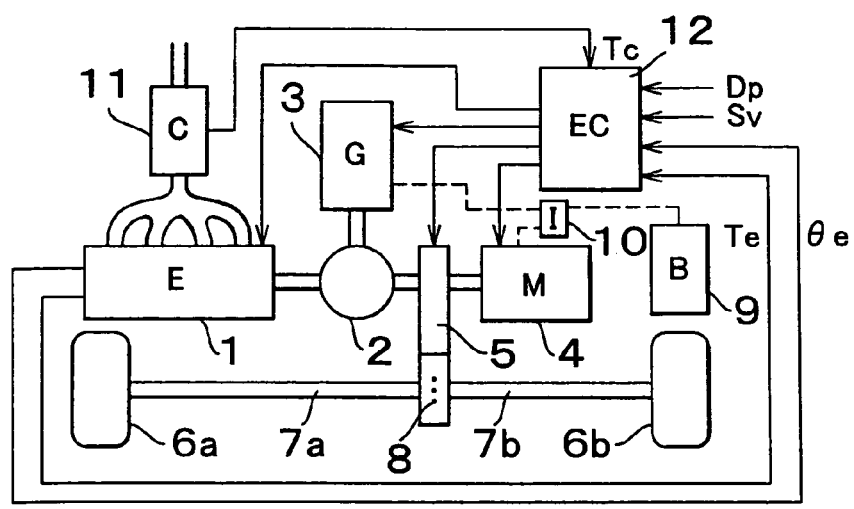
FIG. 1 is a schematic view showing one example of a driving system of a hybrid vehicle.
Figure 2:
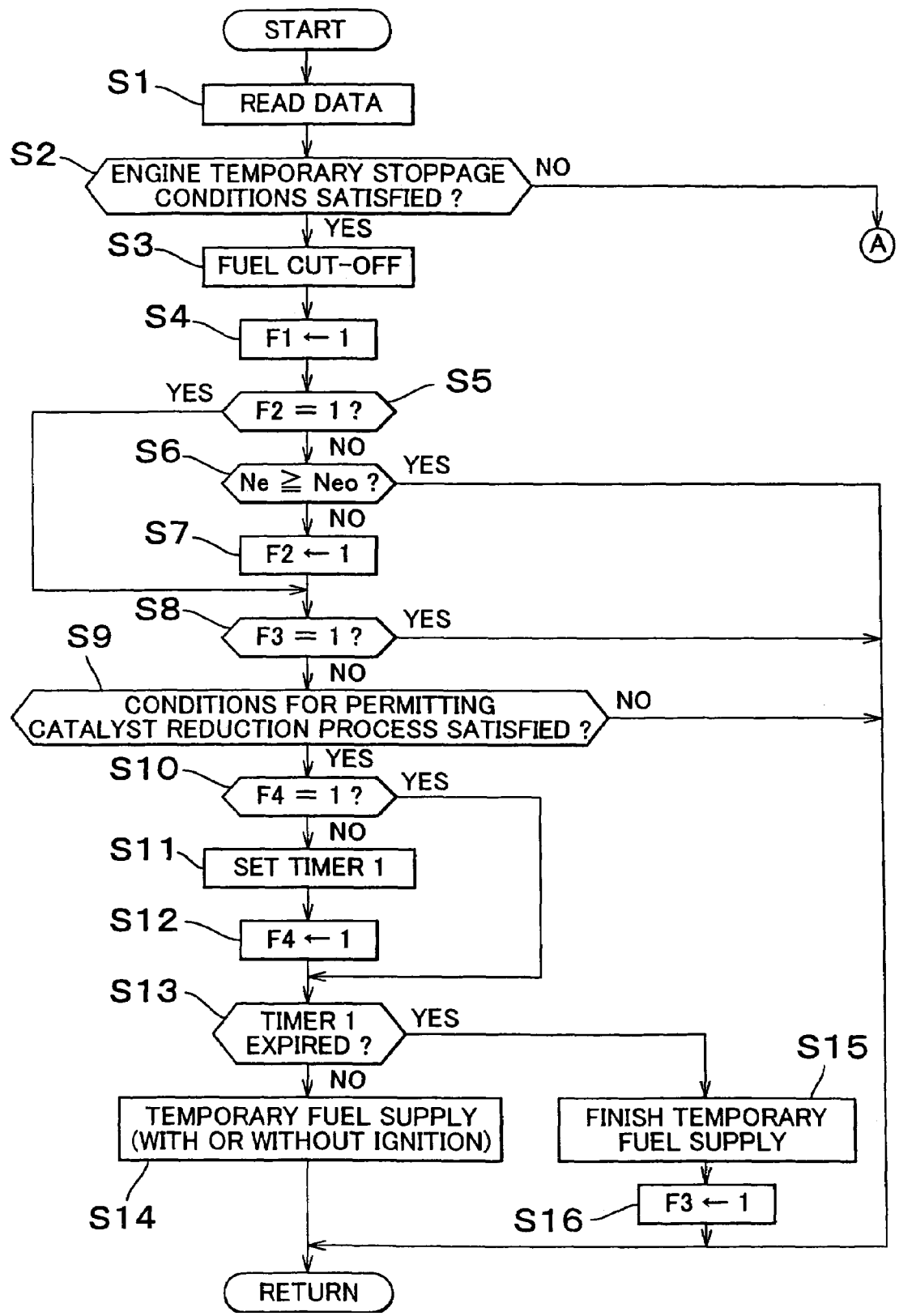
FIG. 2 is a flowchart showing a part of a control routine according to one comprehensive embodiment of the invention, for explaining a method of controlling an internal combustion engine capable of intermittent operations.
Figure 3:
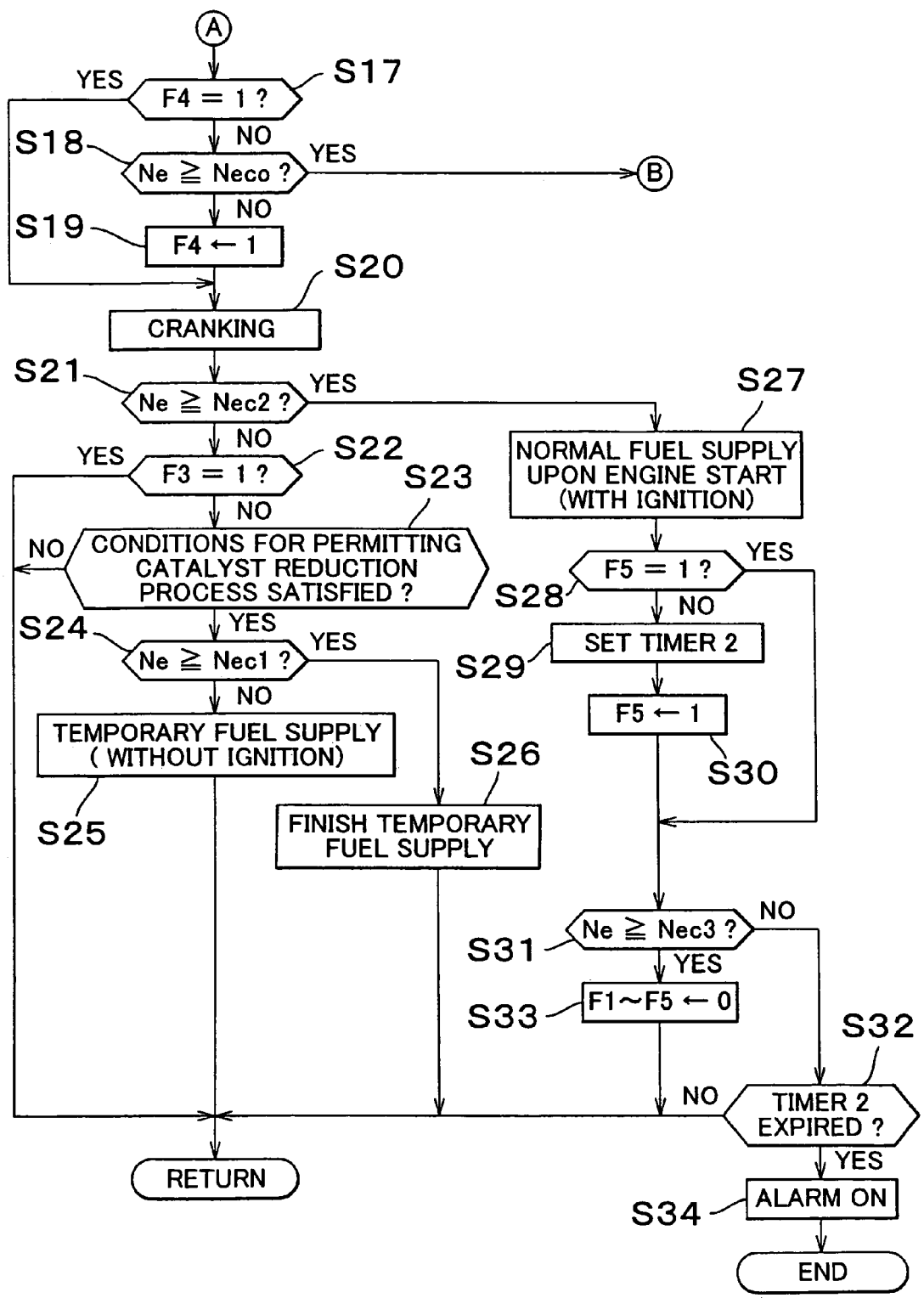
FIG. 3 is a flowchart showing another part of the control routine that is linked to "A" in the flowchart of FIG. 2.
Figure 4:
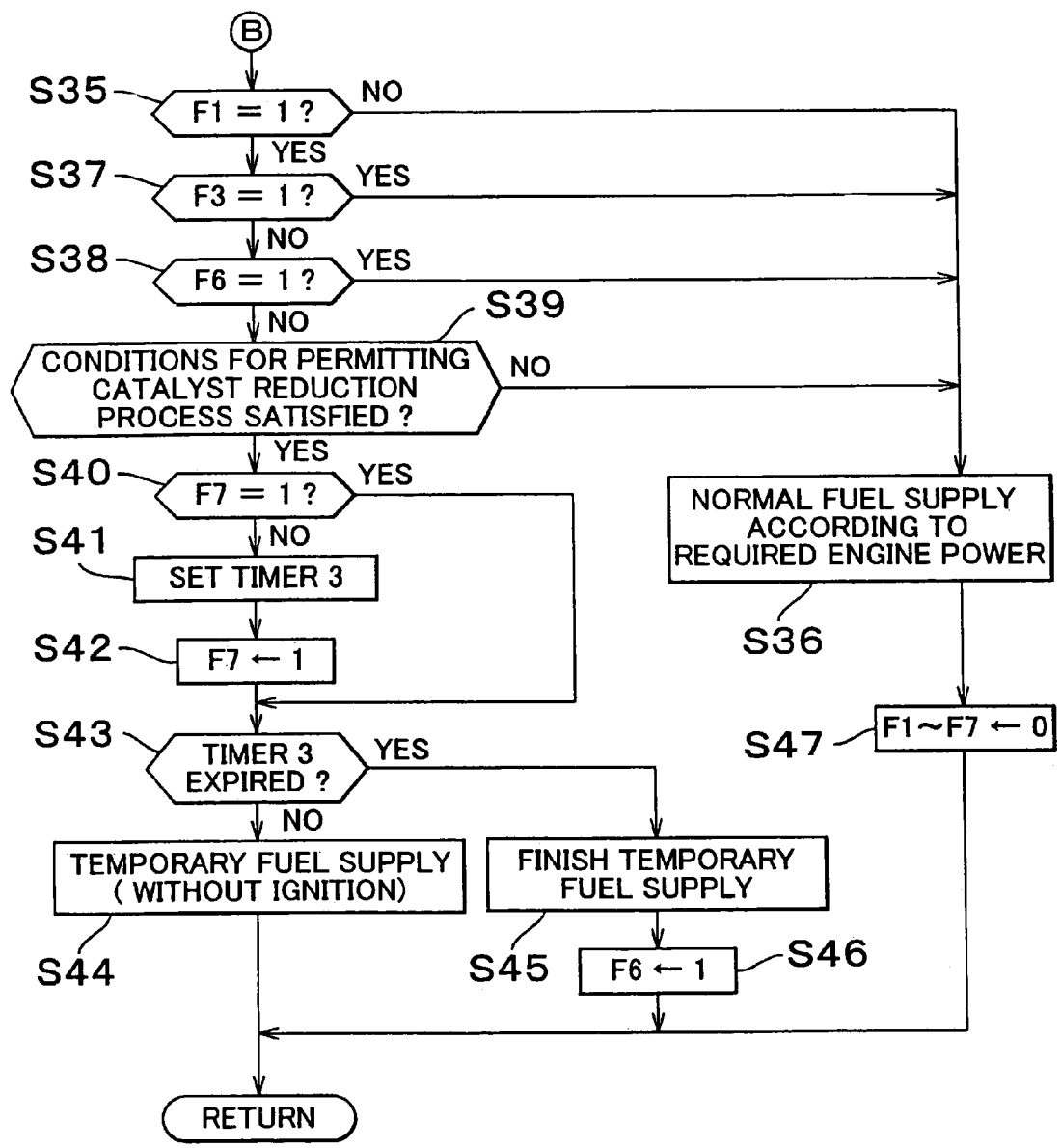
FIG. 4 is a flowchart showing another part of the control routine that is linked to "B" in the flowchart of FIG. 3.

The control according to the flowchart of FIGS. 2, 3 and 4 is initiated at the same time that the vehicle as shown in FIG. 1 starts operating upon closing of an ignition switch (not shown). During the control, a control routine of the flowchart is executed at intervals of several dozens of milliseconds (i.e., it takes several dozens of milliseconds to complete one cycle of the control routine), as well known in the field of control technology.

In step S1 of FIG. 2, data needed for controlling the vehicle as shown in FIG. 1 is read. Since control returns to step S1 after reaching "RETURN" at the end of each control cycle, data read in step S1 is updated every several dozens of milliseconds, based on the current running conditions of the vehicle.

In step S2, it is determined whether engine temporary stop conditions under which the engine can be temporarily stopped are satisfied, based on the data read in step S1. This determination may be made in various manners, and the invention is not limited to any particular manner of making this determination. If an affirmative decision (YES) is obtained in step S2, fuel supplied to the engine is cut off in step S3. Control then proceeds to step S4 to set flag F1 to 1, which indicates that fuel cut-off has been executed. As known in the field of control technology, all flags, i.e., flags F1 through F7 in this embodiment, are reset to zero upon a start of the control routine.

In step S5, it is determined whether flag F2 is equal to 1. When step S5 is executed for the first time, flag F2 is equal to zero, and step S6 is then executed to determine whether the engine speed Ne is equal to or greater than a threshold value or reference value Neo. When the engine idles at a speed equal to or greater than the threshold value Neo, a catalyst reduction process is not carried out upon a temporary stoppage of the engine, but will be carried out when the engine resumes its operation. When a negative decision (NO) is obtained in step S6, namely, when the engine speed decreases to be lower than the threshold value Neo, flag F2 is set to 1, and the decision made in step S5 in the following cycles is fixed (namely, YES is obtained in step. S5). The control then proceeds to step S8 to determine whether flag F3 is equal to 1. The flag F3 will be set to 1 when the control proceeds to step S16 later, but is equal to zero until step S16 is reached. Step S8 is followed by step S9 as long as a negative decision (NO) is obtained in step S8.

In step S9, it is determined whether conditions for permitting a catalyst reduction process are satisfied. One main condition is whether the catalyst has been warmed up, namely, whether the temperature of the catalyst is equal to or higher than a predetermined activation temperature.. If the catalyst temperature is excessively high, however, the catalyst may be overheated by a catalyst reduction process. Thus, an upper limit of the catalyst temperature may be another condition for permitting a catalyst reduction process. If an affirmative decision (YES) is obtained in step S9, the control proceeds to step S10. If a negative decision (NO) is obtained in step S9, on the other hand, the current cycle of the control routine is terminated.

In step S10, it is determined whether flag F4 is equal to 1. If a negative decision (NO) is obtained in step S10, step S11 is executed to set timer 1, and step S12 is then executed to set flag F4 to 1. These steps S10 to S12 are provided for starting the timer 1.

Next, in step S13, it is determined whether the time measured by the timer 1 has reached a predetermined value. If a negative decision (NO) is obtained in step S13, step S14 is executed to temporarily supply (inject) fuel for reducing the catalyst. The temporary fuel supply may be carried out either while operating the ignition device as in normal engine operations, or without operating the ignition device. The fuel is temporarily supplied only for the predetermined period of time set by the timer 1. Upon a lapse of the predetermined time, step S15 is executed to stop the temporary fuel supply, and step S16 is then executed to set flag F3 to 1, which indicates that temporary fuel supply for reducing the catalyst is finished. In the following control cycles, only steps S1 through S8 are repeatedly executed until a negative decision (NO) is obtained in step S2.

If a period for temporarily stopping the engine expires, or if the engine is required to generate power through depression of an accelerator pedal, for example, during the engine temporary stoppage period, a negative decision (NO) is obtained in step S2. In this case, control proceeds to step S17 to determine whether flag F4 is equal to 1. If a negative decision (NO) is obtained in step S17, control proceeds to step S18 to determine whether the engine speed Ne is equal to or greater than a predetermined threshold value Neco. The predetermined threshold value Neco is determined as a reference value above which the engine can resume its operation only by restarting fuel supply, without requiring cranking. If a negative decision (NO) is obtained in step S18, flag F4 is set to 1 in step S19, whereby the decision made in step S17 is fixed to YES in the following control cycles. Subsequently, control proceeds to step S20 in which cranking is performed.

Once cranking is initiated, it is determined in step S21 whether the engine speed Ne has reached a predetermined value Nec2. When the engine speed Ne is equal to or greater than the predetermined value Nec2, normal fuel supply upon a start of the engine by cranking should be initiated. If a negative decision (NO) is obtained in step S21, step S22 is executed to determine whether flag F3 is equal to 1. As described above, flag F3 is set to 1 in step S16 when temporary fuel supply started in the above step S14 is finished. When step S22 determines that flag F3 is equal to 1, reduction of the catalyst has been finished, and no further catalyst reduction is needed at the time of cranking. In this case, therefore, control returns to step S1, and cranking is continued (with steps S20–S22 repeatedly executed) until the engine speed Ne reaches the predetermined value Nec2.

If a negative decision (NO) is obtained in step S22, control proceeds to step S23 to determine whether conditions for permitting a catalyst reduction process are satisfied, as in the above-described step S9. If an affirmative decision (YES) is obtained in step S23, step S24 is executed to determine whether the engine speed Ne has reached a predetermined threshold value Nec1, which is lower than the above-indicated threshold value Nec2. If the engine speed Ne is equal to or greater than the predetermined value Nec1, temporary fuel supply for reducing the catalyst in the initial period of cranking should be finished. Since a negative decision (NO) is obtained when step S24 is executed for the first time, control proceeds to step S25 to start temporary supply of fuel for reducing the catalyst. In a preferred embodiment, the temporary fuel supply in the initial period of cranking is carried out while the ignition device is not operated, though the temporary fuel supply may be carried out while the ignition device is being operated as in a normal engine operation. In this case, the amount of fuel temporarily supplied may be set to a desired value by setting the value of Nec1 as desired. If an affirmative decision (YES) is then obtained in step S24, temporary fuel supply is stopped in step S26.

If cranking continues after the catalyst reduction process is finished in step S26, and the engine speed is further increased until an affirmative decision (YES) is obtained in step S21, control proceeds to step S27 to start normal fuel supply upon a start of the engine by cranking so that the engine increases its revolution speed by itself. In order to check a result of the normal fuel supply to thus confirm normal starting of the engine, control proceeds to step S28 to determine whether flag F5 is equal to 1. If a negative decision (NO) is obtained in step S28, which occurs only when this step is executed for the first time, control proceeds to step S29 to set timer 2, and then proceeds to step S30 to set flag F5 to 1. In the following step S31, it is determined whether the engine speed Ne has reached a predetermined threshold value Nec3, which indicates that the engine has started successfully. A negative decision (NO) is initially obtained in step S31 in a certain number of cycles, and control proceeds to step S32 to determine whether the time measured by the timer 2 has reached a predetermined value. If a negative decision (NO) is obtained in step S32, control returns to step S1 to read again or update data and continue control. If the engine starts normally and successfully, the negative decision (NO) that has been obtained in step S31 is replaced by an affirmative decision (YES) after a while. In this case, step S33 is executed to reset all of flags F1 through F5 to zero, so that the electronic control unit returns to its initial state, and is thus ready for the next control for temporary fuel supply.

If the engine does not start normally for some reason, a negative decision (NO) continues to be obtained in step S31 for a while until an affirmative decision (YES) is obtained in step S32. In this case, control proceeds to step S34 to generate an alarm that informs the driver that the engine has failed to start. In this embodiment, which is only exemplary, the control routine is finished after execution of step S34. It is, however, also possible to perform some type of automatic control when an affirmative decision (YES) is obtained in step S32, though the invention is not concerned with the manner of performing such automatic control.

When an affirmative decision (YES) is obtained in step S18, namely, if the engine speed Ne is equal to or greater than the threshold value Neco, for example, when the engine is required to restart after a temporary stoppage, control proceeds to step S35 of FIG. 4 to determine whether flag F1 is equal to 1. If a negative decision (NO) is obtained in step S35, which means that fuel cut-off for a temporary stoppage of the engine has not been performed, control proceeds to step S36 to continue normal fuel supply (i.e., fuel supply for normal engine operations) in accordance with a request for power to be generated by the engine.

If an affirmative decision (YES) is obtained in step S35, step S37 is then executed to determine whether flag F3 is equal to 1. As described above, flag F3 is set to 1 when temporary fuel supply for catalyst reduction, which is carried out while the engine is still rotating after normal fuel supply is cut off, is finished. Since another catalyst reduction process is not necessary when flag F3 is equal to 1, control proceeds to step S36 to perform normal fuel supply to the engine.

When a negative decision (NO) is obtained in step S37, step S38 is executed to determine whether flag F6 is equal to 1. The flag F6 will be set to 1 when control reaches step S46 later. In other words, the flag F6 is reset to zero until step S46 is reached. In the following step S39, it is determined whether conditions for permitting a catalyst reduction process are satisfied, as in the above-described step S9 or step 523. If an affirmative decision (YES) is obtained in step S39, step S40 is executed to determine whether flag F7 is set to 1. This step S40 and the following steps S41 and S42 are provided for starting timer 3. After the timer 3 is started in step S41 and flag F7 is set to 1 in step S42, control proceeds to step S43 to determine whether the time measured by the timer 3 has reached a predetermined value, namely, whether temporary supply of fuel for reducing the catalyst, which will be started in the following step S44, has been carried out for a predetermined period of time. The temporary fuel supply, which continues for the predetermined time set by the timer 3 and is finished in step S45, may be performed while the ignition device is operated as in normal engine operations. In a preferred embodiment, however, the temporary fuel supply is performed while the ignition device is not operated. The temporary fuel supply without ignition is performed for catalyst reduction prior to return to normal fuel supply, when the engine can resume its operation without requiring cranking, but only by resuming normal supply of fuel to the engine. Once the temporary fuel supply is finished in step S45, and flag F6 is set to 1 in step S46, an affirmative decision (YES) is obtained in step S38, which is followed by step S36. After execution of step S36, all of flags F1 through F7 are reset to zero in step S47, and the electronic control unit is ready for the next temporary stoppage of the engine.

As described above, the flowchart of FIGS. 2, 3 and 4 incorporates various aspects of the method of controlling an internal combustion engine capable of intermittent operations, for reducing NOx emissions according to exemplary embodiments of the invention. It is, however, to be understood that the invention is not limited to execution of all of the aspects of the control method as illustrated by the flowchart of FIGS. 2, 3 and 4. Rather, only a selected aspect or aspects of the control method (i.e., only a selected portion or portions of the flowchart of FIGS. 2, 3 and 4) may be executed without departing from the scope of the invention.

In the illustrated embodiment, the apparatus is controlled by the controller (e.g., the electronic control unit 12), which is implemented as a programmed general purpose computer.

It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A method of controlling an internal combustion engine of a vehicle in which an exhaust purifying catalyst is provided in an exhaust system of the internal combustion engine, the method comprising the steps of:
   controlling burning of fuel to operate the internal combustion engine; and
   injecting fuel into the internal combustion engine during a moving state of the engine while leaving substantially all the fuel unburned, before a normal operation of the engine by fuel being burned.

2. The control method according to claim 1, wherein the step of injecting fuel includes injecting fuel into the internal combustion engine that shifts to the moving state, without causing the fuel to be burned, when a predetermined condition is satisfied while the vehicle is running.

3. The control method according to claim 2, further comprises stopping burning of the fuel by cutting a fuel supply to the internal combustion engine.

4. The control method according to claim 1, wherein the step of injecting fuel includes injecting fuel into the internal combustion engine that shifts to the moving state, without causing the fuel to be burned, when the vehicle starts to be driven by a motor after being driven by the internal combustion engine.

5. The control method according to claim 1, wherein the step of injecting fuel includes injecting fuel into the internal combustion engine that shifts to the moving state, without causing the fuel to be burned, before the vehicle starts to be driven by the internal combustion engine and after being driven by a motor.

6. The control method according to claim 1, further comprising not injecting fuel into the internal combustion engine that shifts to the moving state based on a temperature of the exhaust purifying catalyst.

7. The control method according to claim 1, wherein the step of injecting fuel includes injecting fuel into the internal combustion engine that shifts to the moving state and not igniting the fuel.

8. The control method according to claim 1, further comprising the step of:
driving the internal combustion engine by the burning of the fuel when the speed of the internal combustion engine has become equal to, or greater than, a predetermined speed.

9. The control method according to claim 1, further comprising not injecting fuel into the internal combustion engine that shifts to the moving state when the speed of the internal combustion engine is equal to, or greater than, a predetermined speed.

10. The control method according to claim 1, wherein the step of injecting fuel includes injecting fuel for a predetermined amount of time into the internal combustion engine that shifts to the moving state.

11. A control system for controlling an internal combustion engine of a vehicle in which an exhaust purifying catalyst is provided in an exhaust system of the internal combustion engine, the system comprising:
a controller that controls burning of fuel to operate the internal combustion engine, wherein the controller causes fuel to be injected into the internal combustion engine during a moving state of the engine while leaving substantially all the fuel unburned, before a normal operation of the engine by fuel being burned.

12. The control system according to claim 11, wherein the controller causes the fuel to be injected into the internal combustion engine that shifts to the moving state, without causing the fuel to be burned, when a predetermined condition is satisfied while the vehicle is running.

13. The control system according to claim 12, wherein the controller causes burning of the fuel to be stopped by cutting a fuel supply to the internal combustion engine.

14. The control system according to claim 11, wherein the controller causes the fuel to be injected into the internal combustion engine that shifts to the moving state, without causing the fuel to be burned, when the vehicle starts to be driven by a motor after being driven by the internal combustion engine.

15. The control system according to claim 11, wherein the controller causes the fuel to be injected into the internal combustion engine that shifts to the moving state, without causing the fuel to be burned, before the vehicle starts to be driven by the internal combustion engine and after being driven by a motor.

16. The control system according to claim 11, wherein the controller prohibits the fuel from being injected into the internal combustion engine that shifts to the moving state based on a temperature of the exhaust purifying catalyst.

17. The control system according to claim 11, wherein the controller causes the fuel to be injected into the internal combustion engine that shifts to the moving state and not be ignited by an ignition device.

18. The control system according to claim 11, wherein the controller causes the internal combustion engine to operate by burning the fuel when the speed of the internal combustion engine has become equal to, or greater than, a predetermined speed.

19. The control system according to claim 11, wherein the controller does not inject fuel into the internal combustion engine that shifts to the moving state when the speed of the internal combustion engine is equal to, or greater than, a predetermined speed.

20. The control system according to claim 11, wherein the controller causes fuel to be injected for a predetermined amount of time into the internal combustion engine that shifts to the moving state.

21. A control system for controlling an internal combustion engine of a vehicle in which an exhaust purifying catalyst is provided in an exhaust system of the internal combustion engine, the control system comprising:
means for controlling burning of fuel to operate the internal combustion engine; and
means for injecting fuel into the internal combustion engine during a moving state of the engine while leaving substantially all the fuel unburned, before a normal operation of the engine by fuel being burned.

* * * * *